Aug. 9, 1932.  C. A. CAMPBELL  1,871,110
AUTOMOTIVE BRAKE SYSTEM
Original Filed Aug. 8, 1928
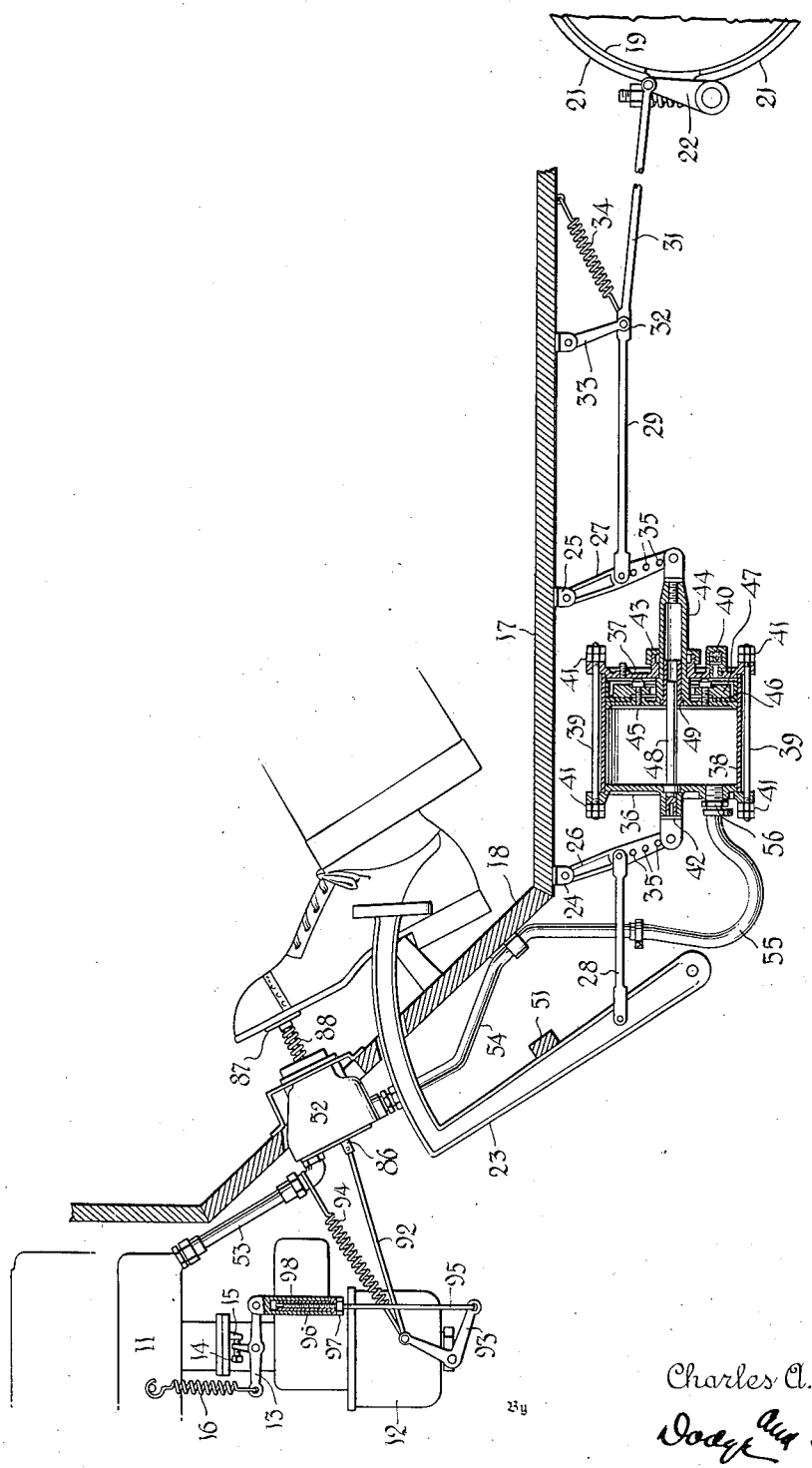
Inventor
Charles A. Campbell
By Dodge
Attorneys Patented Aug. 9, 1932

1,871,110

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

AUTOMOTIVE BRAKE SYSTEM

Original application filed August 8, 1928, Serial No. 298,229, and in Canada January 16, 1929. Divided and this application filed October 9, 1930. Serial No. 487,615.

This invention relates to fluid pressure brake systems, and will be described as applied to a so-called vacuum system in which the necessary suction is derived by connecting the brake system to the intake manifold of an internal combustion engine. The present application is a division of my prior application Serial No. 298,229, filed August 8, 1928.

In automatic brake systems two lines of development have been followed; the first, and commercially the more common type is known as the Servo-motor type, and is arranged so that when the operator depresses the ordinary foot pedal the brake motor assists him. The other type, commonly called the straight power type, makes use of a brake valve entirely distinct from the brake pedal, and produces a graduated power application of the brakes without depression of the ordinary foot pedal.

The present application is directed to the construction and mounting of the brake cylinder in such a way that it may be interposed in conventional brake rigging without impairing the normal foot operation of the brake pedal. The brake is of the straight power type.

Generally stated, I make use of a suction cylinder which in release position is subject to atmospheric pressure at both ends. This cylinder is sustained by a pair of links, one connected to the cylinder and the other to the piston rod, the two links being interposed between sections of one of the pull rods forming part of the brake rigging.

So arranged the device is applicable to brakes of the mechanical type, regardless of the number of wheels equipped with brakes and it becomes possible to provide the suspending-links with a series of holes which permit the attainment of different brake lever ratios for the cylinder without disturbing the foot brake lever ratio. In this way a single size of cylinder is rendered applicable to motor cars of various weights and adjustment is provided for different adhesions such as are incident to snow in winter and the like.

In its release position the piston is at its limit of motion and the piston and cylinder then serve merely as a connecting link element in the brake rigging so that foot actuation is possible.

The invention will be described as controlled by the valve mechanism forming the subject matter of the parent application, but it will be understood that it may be controlled by other mechanisms.

The preferred embodiment of the invention is illustrated in the accompanying drawing, which is a diagrammatic view, partly in section, showing the brake cylinder and brake pedal controlling valve, and so much of a motor vehicle as is necessary to explain the construction and operation of the device.

In the drawing, 11 indicates the intake manifold of an internal combustion engine, for example, the ordinary gasoline engine used on motor vehicles. 12 is a carbureter and 13 is the throttle lever. This lever operates an ordinary butterfly valve, and in idling position, which is the closed position of the throttle, an adjustable stop screw 14 on the lever 13 engages a limit stop 15. The lever 13 is urged toward idling position by a spring 16. A portion of the floor or frame work of an ordinary motor vehicle is conventionally represented at 17, and 18 is the inclined footboard. 19 represents a brake drum and 21 a brake band coacting therewith and capable of being contracted upon the drum by means of the usual cam mechanism (not shown) which is actuated by the lever 22. When the lever 22 swings in the counter clockwise direction the brakes are applied. The foot lever customarily used to operate the lever 22 is indicated at 23.

The parts so far described are merely representative of similar parts common to practically all automobiles, and will take various forms according to the preference of designers.

In the conventional brake the levers 23 and 22 are connected by a tension link or by a plurality of tension links connected to each other. According to the present invention, a pair of brackets 24 and 25 are mounted on the frame member 17 and carry the swinging brake cylinder levers 26 and 27. The lever 26 is connected by link 28 with the foot lever 23 and the lever 27 is connected by two links 29 and 31 with the lever 22. The links 29 and 31 are pinned to each other at 32 and are there guided by a swinging link 33. A tension spring 34 operates to release the brakes.

Below the points of connection of the links 28 and 29, the levers 26 and 27 are each provided with a series of spaced holes 35 to give variable points of attachment for the brake cylinder. This cylinder is made up of two heads 36 and 37, a barrel portion 38 and a plurality of tie-rods 39 with nuts 41. The tie-rods clamp the heads in sealing relation with the opposite ends of the barrel. The head 36 carries at its center a boss 42 which is pivoted to the brake cylinder lever 26. The head 37 has a central aperture with a stuffing box 43 and through this works the tubular piston rod 44 connected to a brake piston 45. The head 37 is provided with an atmospheric port and dust strainer indicated generally by the numeral 40. The brake piston 45 works in the cylinder barrel 38 in which it is sealed by means of a cup-leather 46. The cup-leather 46 is clamped in place by means of a follower 47.

The guide rod 48 fixed in the head 36 slides through the bushing 49 and extends into the tubular piston rod 44. In this way the piston is guided independently of the barrel 38 and alinement is maintained at all times, notwithstanding the fact that the cylinder is supported at its rear end by the rod 44, which, as shown, is pivoted to the lower end of the lever 27. In release position the piston 45 is against the head 37 and in such case the brakes may be applied by depressing the foot lever 23 in the usual manner. Power application of the brakes is made by evacuating the space to the left of the piston 45. The effect is to draw the levers 26 and 27 toward each other. Since the lever 23 is arrested by the usual limit stop 51 the lever 22 is necessarily swung to the left to apply the brakes.

The brake valve is indicated generally by the numeral 52 applied to its body. It has a suction connection 53 with the intake manifold 11. The connection to the brake cylinder is made up of a pipe 54 and a flexible hose 55 connected thereto and to a suction nipple 56 in the head 36 of the brake cylinder.

The construction of the brake valve 52 is not material to the present invention beyond pointing out that the accelerator push rod 86 which terminates at its upper end in the accelerator button 87, is slidable through the actuating member of the brake valve, and that this actuating member applies the brakes when the push rod 86 moves upward. The push rod 86 is formed with a shoulder, not shown, which engages the controlling member of the brake valve and forces this upward to apply the brakes if the plunger 86 be moved upward beyond the normal idling position. The spring 88 urges the controlling member of the brake valve toward such shoulder. The push rod 86 is connected to a link 92 which serves as an actuating connection for the throttle, the throttle being opened when the push rod 86 is depressed.

The link 92 is connected to one arm of a bell crank 93. A return spring 94 is connected to rotate the bell crank 93 clockwise, that is, in such direction as to move the accelerator push rod 86 upward or outward in a brake applying direction. The other arm of the bell crank 93 is connected to a push rod 95. This carries an adjustable thrust member 96 threaded thereon and locked in place by a check nut 97. The thrust member 96 telescopes into and enters into a one-way thrust engagement with a sleeve member 98 pivoted to the lever 13.

The parts are preferably so adjusted that when the shoulder on the push rod 86 picks up the actuating member of the valve 52 to shift the same in a brake-applying direction, the thrust member 96 will have moved slightly out of thrust relation with the sleeve 98. This is to allow a little lost motion or interval between the position at which the throttle commences to open when push rod 86 is depressed, and the position at which the brake commences to apply when the push rod is allowed to move upward from idling position.

The accelerator button 87 thus serves as a dual control having an intermediate neutral position in which the engine idles, and the brakes are released. If depressed from this position the brake is held released and the motor is accelerated. If allowed to rise above this position, under the urge of the spring 94, the throttle is left in idling position and the brakes are applied with progressively increasing force, according to the distance the button 87 is allowed to rise. The effect of the brake valve is to evacuate the space forward, i. e., to the left of the piston 47, drawing the levers 26 and 27 together and shortening the connection between the foot pedal 23 and the rock lever 22. In release position both sides of piston 47 are subject to atmospheric pressure and the piston moves to the position shown in the drawing, in which the brakes are released. In release position the brake cylinder acts merely as a connecting link between the levers 26 and 27 and the brakes may be applied by depressing the foot pedal 23 as usual.

The provision of the holes 35 in the levers 26, 27, permits changes in the leverage of the brake cylinder with respect to the brake rigging without affecting the leverage of the brake pedal 23 relatively to the rock lever 22. For best braking effect, it is important to apply the brakes with a force nearly but not quite sufficient to cause sliding of the wheels. The adjustment of the brake cylinder relatively to the levers 26 and 27 will allow a single brake cylinder to be adjusted to conform to the requirements of cars of different weights or to different tractive conditions. For example, on snow it might be desirable to use a lower lever ratio and thus reduce the tendency to skid. A heavier lever ratio can be used on heavy cars. Also the preferences of the operator will control to a considerable degree.

The valve mechanism, and the connections between it and the throttle are claimed in the parent application above identified.

What is claimed is,—

1. In a brake mechanism, the combination of an operator actuated member; a brake; a pair of normally substantially parallel swinging levers, one connected with said operator actuated member and the other connected with said brake; a brake applying motor comprising a cylinder and piston, said motor when in its inert condition serving as a mechanical connection between said levers; and means for operating said motor by pressure fluid without requiring motion of said operator actuated member.

2. In a brake mechanism, the combination of an operator actuated member; a brake; a pair of normally substantially parallel pivoted levers, said levers extending in the same direction from their pivots, and one being connected with the operator actuated member and the other with the brake; a brake applying motor comprising a cylinder and piston, said motor in its inert condition serving as a mechanical connection between the levers; means for adjusting the points of connection of said motor with both the levers whereby the leverage relation of the motor to the brake may be varied without varying the leverage relation of the operator actuated member to the brake; and means for operating said motor by fluid pressure.

3. In a combined power and manually operable brake mechanism, the combination of a brake; an operator actuated member; a brake valve; a pair of pivoted levers, one connected with said operator actuated member and the other with said brake; and a pressure motor subject to control by said valve and comprising a cylinder connected to one lever and a piston connected to the other lever, said motor being supported by said levers and serving, when in its inert condition, as a positive mechanical connection between said levers when the operator actuated member is moved in a brake applying direction.

4. In a combined power and manually operable brake mechanism, the combination of a brake; an operator actuated member; a brake valve; a pair of pivoted levers, one connected with said member and the other with said brake; a pressure motor including a piston, a cylinder, and means for limiting the relative motion thereof, said motor being subject to control by said brake valve; pivoted connections between the piston and one of said levers and between the cylinder and the other of said levers; and means for adjusting said pivoted connections to vary the effective lengths of said levers.

5. In a combined power and manually operable brake mechanism, the combination of a brake; an operator actuated member; a brake valve; a pair of pivoted levers, one connected with said member and the other with said brake; a cylinder connected to one of said levers; a piston connected to the other of said levers; a piston guide wholly within the cylinder and with which said piston coacts while reciprocating in said cylinder; and a flexible packing between the piston and cylinder.

6. The combination of a cylinder having a head formed with a guideway for a piston rod, and another head provided with a piston guide alined with said guideway; a piston working in said cylinder guided by said guide and having a hollow piston rod which receives said guide and reciprocates in said guideway; a pair of movable members adapted for connection with brake rigging; and connections between said cylinder and one of said members and between said piston rod and the other of said members, said connections serving to support said cylinder and piston.

7. In a brake mechanism, the combination of a pair of supports; a pair of levers pivoted to said supports; brake rods connected with said levers; and a brake motor comprising a cylinder connected to one of said levers and a piston connected to the other of said levers, said piston and cylinder serving when the motor is inert as a mechanical connection between said levers, and at such time serving to maintain said levers substantially parallel with each other, and said motor when active serving to displace said levers from such parallel relation.

In testimony whereof I have signed my name to this specification.

CHARLES A. CAMPBELL.